United States Patent [19]

Baines

[11] Patent Number: 4,851,729
[45] Date of Patent: Jul. 25, 1989

[54] ELECTRIC MOTOR

[75] Inventor: Roger F. Baines, Repulse Bay, Hong Kong

[73] Assignee: Johnson Electric Industrial Manufactory, Limited, Chaiwan, Hong Kong

[21] Appl. No.: 205,509

[22] Filed: Jun. 7, 1988

Related U.S. Application Data

[63] Continuation of Ser. No. 26,178, Mar. 16, 1987.

[30] Foreign Application Priority Data

Mar. 17, 1986 [GB] United Kingdom ............... 8606494

[51] Int. Cl.$^4$ ............................................ H02K 13/00
[52] U.S. Cl. ................................. 310/239; 310/43; 310/71; 310/91; 310/154; 310/248
[58] Field of Search ................... 310/43, 91, 89, 177, 310/71, 154, 258, 42, 233, 40 MM, 248, 239, 241, 242, 249

[56] References Cited

U.S. PATENT DOCUMENTS

| | | | |
|---|---|---|---|
| 3,095,515 | 6/1963 | Case | 310/43 |
| 3,444,402 | 5/1969 | Cartier | 310/154 |
| 3,521,096 | 7/1970 | Merriam | 310/91 |
| 3,760,209 | 9/1973 | Hult | 310/89 |
| 3,831,048 | 8/1974 | Wagner | 310/90 |
| 4,071,794 | 1/1978 | Schoen | 310/154 |
| 4,414,481 | 11/1983 | de Jong | 310/154 |
| 4,623,810 | 11/1986 | Smith | 310/43 |
| 4,677,330 | 6/1987 | Watanabe | 310/154 |

FOREIGN PATENT DOCUMENTS

| | | |
|---|---|---|
| 3426996 | 2/1986 | Fed. Rep. of Germany . |
| 2432790 | 2/1980 | France . |
| 61-196747 | 8/1986 | Japan . |
| 1014163 | 12/1965 | United Kingdom . |
| 1251574 | 10/1971 | United Kingdom . |
| 1463778 | 2/1977 | United Kingdom . |

Primary Examiner—R. Skudy
Attorney, Agent, or Firm—Fleit, Jacobson, Cohn, Price, Holman & Stern

[57] ABSTRACT

The motor has a plastic holding member which is a sliding fit in a casing of the motor and which supports at least one pair of segment magnets and brush gear for the motor in a fixed angular position relative to one another.

13 Claims, 1 Drawing Sheet

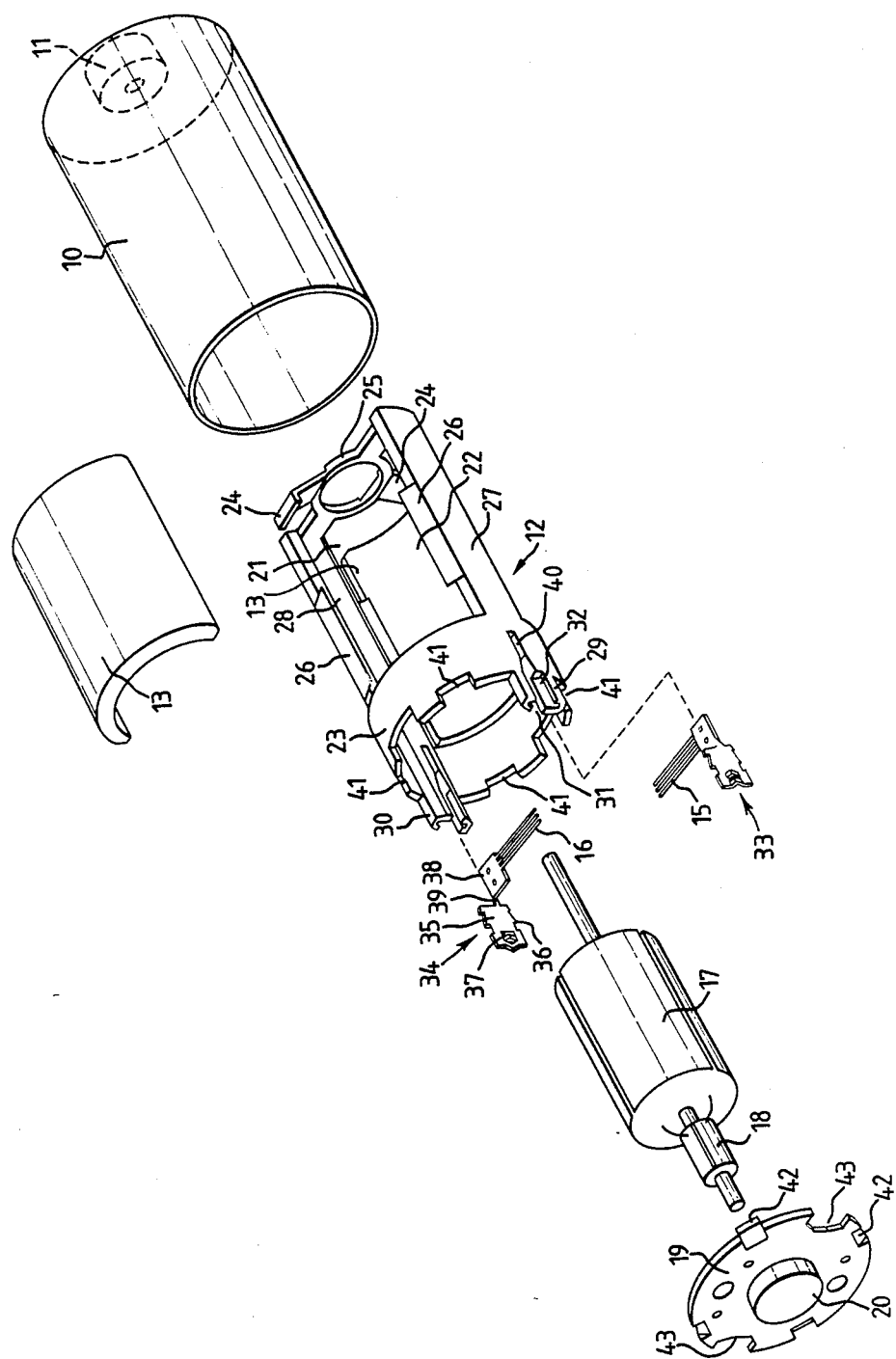

ELECTRIC MOTOR

This application is a continuation application under 37 C.F.R. 1.62 of prior application Ser. No. 026,178, filed on Mar. 16, 1987, entitled ELECTRIC MOTOR.

BACKGROUND OF THE INVENTION

This invention relates to an electric motor and in particular to a fractional horsepower permanent magnet direct current motor.

In very small p.m.d.c. motors there are several problems associated with the construction of the motor due to the smallness of the dimensions, the tolerances, and the delicateness of the parts of the motor.

For example, segment magnets which are preferably not ground to save expense have quite large tolerances due to the number of variables which affect their dimensions. Some means of accommodating the tolerances has to be used which will not create problems of non-symmetry of the assembly. Previous means have included glueing and piercing the motor housing to create locking wings which react against a spring separating the magnets.

SUMMARY OF THE INVENTION

According to the present invention there is provided an electric motor comprising a casing, a plastics holding member mounted in the casing, a rotor having a commutator mounted within the plastics holding member, and an end cap closing the casing, the plastics holding member supporting at least one pair of segment magnets and brush gear for the motor in a fixed angular position relative to one another.

This provides a convenient way of supporting both the segment magnets and the brush gear. Moreover, because the end cap does not have to support the brush gear it allows the use of a simple metal and cap supporting a motor bearing to thus provide a good heat sink to lower the operating temperature of the bearing.

BRIEF DESCRIPTION OF THE DRAWING

The accompanying DRAWING is a perspective exploded view of one embodiment of a motor according to the present invention.

DESCRIPTION OF THE PREFERRED EMBODIMENT

Referring to the DRAWING, the motor shown therein comprises a can-like metal casing 10 supporting one motor bearing 11 at its closed end, a holding member 12 moulded in resilient plastics material, such as, Delrin trademark, two segment magnets 13 and brush leaves 15 and 16 supported by the holding member 12 in a fixed angular position relative to one another, a wound armature 17 having a commutator 18, and a metal end cap 19 supporting the other motor bearing 20.

The holding member 12 is of generally tubular shape and is a sliding fit inside the casing 10. The holding member 12 has two diametrically opposed arcuately extending windows 21 and 22 bounded at one end by a collar portion 23, and at the other end by resilient ears 24 which project radially outwards from an apertured end web 25. These windows 21 and 22 receive the segment magnets 13, respectively, and the ears 24 urge the magnets against the inner circumferentially extending edge of the collar portion 23. The resilient nature of the ears 24 accommodates longitudinal tolerances of the magnets 13. Resilient wing portions 26 are provided at the longitudinally extending edges of the windows and these serve to urge the magnets 13 radially outwards against casing 10 of the motor.

The portions of the holding member 12 intermediate the two windows 21 and 22 are in the form of pillars 27 and 28 which extend beyond the outer circumferentially extending edge of the collar portion 23. Motor terminal housings 29 and 30 are provided in the end portions of the pillars 27 and 28, respectively, adjacent to the collar portion 23. Each housing 29, 30 is open at the free end of the pillar and has axially extending slots 31 and 32 in its radially innermost and radially outermost walls, respectively. Furthermore, the inner end of each housing 29, 30 communicates with a slot 40 in the collar portion 23. The slots 31, 32 and 40 define locating means extending in the direction parallel to the axis of the motor for positioning the brush gear on the holding member.

Motor terminals 33 and 34 each comprise a terminal portion 35 having barbs 36 along opposite side edges and a wire receiving formation 37 adjacent one end, and a brush leaf supporting portion 38 connected to the other end of the terminal portion 35 by a neck portion 39, the neck portion 39 including a 90° twist so as to orientate the portion 38 at 90° to the terminal portion 35.

Brush leaves 15 and 16 are secured to portions 38 of the motor terminals 33 and 34, respectively, such as by rivetting and the motor terminals 33 and 34 are located in respective housings 29 and 30 with the portions 38 located in and projecting radially inwardly from respective slots 40, the barbs 36 biting into the walls of the housings 29 and 30 to hold the motor terminals 33 and 34 in place.

The holding member 12 has four notches 41 to received tabs 42 bent out of the plane of the end cap 19. The end cap 19 also has two cut outs 43 to receive the housing 29 and 30. Interengagement between the housings 29 and 30 and cut outs 43 and between the tabs 42 and the notches 41 angularly positions the end cap 19 relative to the holding member 12.

If desired, the end web 25 of the holding member 12 may have one or more small spigots which are received in corresponding holes in the closed end of the casing 10 to angularly position the holding member 12 relative to the casing 10.

The holding member 12 provides a single toleranced reference between the two motor bearings. Moreover, the end cap may be a simple metal stamping which serves as a good heat sink for the bearing 20.

To assemble the motor, the magnets 13 are placed in the windows 21 and 22 of the holding member 12 and held therein while the latter is slid into the casing 10. The armature 17 is then slid into the holding member 12 and a bullet-nosed guide (not shown) is placed on the end of the armature shaft at the open end of the casing 10. The motor terminals 33, 34 are then pushed into respective housings 29, 30, the bullet-nosed guide serving to guide the brush leaves 15, 16 onto the commutator 18 to minimize the risk of damage. In any event, the assembled brush leaves can be visually inspected and if damaged can be replaced. Finally, the end cap 19 is assembled and secured to the casing by peening over portions of the casing to overlie the tabs 42.

A motor as described above could, for example, have a length of 30 mm and a diameter of 16 mm and could fit in the take-up spool of a 35 mm camera.

The above embodiment is given by way of example only and many modifications will be apparent to persons skilled in the art without departing from the scope of the invention defined by the appended claims.

I claim:

1. An electric motor comprising a casing, a plastics holding member mounted in the casing, an armature, having a commutator, mounted within the plastics holding member, and an end cap closing the casing, the plastics holding member supporting at least one pair of segment magnets and brush gear for the motor in a fixed angular position relative to one another, the holding member having arcuately extending windows in which the respective segment magnets are supported and a resilient portion at one end of each window for accommodating longitudinal tolerance of the segment magnets, and the brush gear comprising brush leaves supported by respective motor terminals, the holding member having locating means extending in a direction parallel to the axis of the motor said locating means positioning the brush gear on the holding member.

2. The motor of claim 1, wherein the plastics holding member is of generally tubular shape, the holding member being a sliding fit inside the casing of the motor.

3. The motor of claim 2, wherein resilient portions are provided at the longitudinally extending edges of the windows to urge the segment magnets radially outwards against the casing of the motor.

4. The motor of claim 2, wherein the plastics holding member has brush gear supporting formations at the end thereof adjacent to the end cap.

5. The motor of claim 4, wherein each formation includes a pillar projecting from one end of the holding member.

6. The motor of claim 1, wherein the plastics holding member and the casing have interengaging means for angularly positioning the holding member relative to the casing.

7. The motor of claim 1, wherein the plastics holding member and end cap have interengaging means for angularly positioning the end cap relative to the holding member.

8. The motor of claim 1, wherein the end cap is of metal and wherein a motor bearing is supported by the end cap.

9. A fractional horsepower permanent magnet direct current motor comprising a casing, a plastics holding member mounted in the casing, an armature, having a commutator, mounted within the plastics holding member, and an end cap closing the casing, the plastics holding member supporting at least one pair of segment magnets and brush gear for the motor in a fixed angular position relative to one another, and the brush gear comprising brush leaves supported by respective motor terminals, the holding member having locating means extending in a direction parallel to the axis of the motor said locating means positioning the brush gear on the holding member.

10. The motor of claim 9 having an overall length of substantially 30 mm and a width of substantially 16 mm.

11. An electric motor comprising a can-like casing closed at one end, a first bearing supported by the closed end of the casing, a plastics holding member mounted in the casing, an armature, having a commutator, mounted within the plastics holding member, and an end cap supporting a second bearing, the end cap closing the other end of the casing, the plastics holding member extending between said one end of the casing and the end cap and supporting at least one pair of segment magnets and brush gear for the motor in a fixed angular position relative to one another, and the brush gear comprising brush leaves supported by respective motor terminals, the holding member having locating means extending in a direction parallel to the axis of the motor said locating means positioning the brush gear on the holding member.

12. The motor of claim 10 having an overall length of substantially 30 mm and a width of substantially 16 mm.

13. An electric motor comprising a casing, a plastics holding member mounted in the casing, an armature having a commutator mounted within the plastics holding member, and a end cap closing the casing, the plastics holding member supporting at least one pair of segment magnets and brush gear for the motor in a fixed angular position relative to one another, and the brush gear comprising brush leaves supported by respective motor terminals, the holding member including a housing positioning each brush leaf on the holding member, each housing being open at one end and including an axially extending slot.

* * * * *